United States Patent
Ruutu et al.

(10) Patent No.: US 6,859,447 B1
(45) Date of Patent: Feb. 22, 2005

(54) BROADBAND CELLULAR NETWORK DEVICE

(75) Inventors: Jussi Ruutu, Espoo (FI); Mikko Martikainen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/607,065

(22) Filed: Jun. 29, 2000

Related U.S. Application Data

(63) Continuation of application No. PCT/EP97/07351, filed on Dec. 30, 1997.

(51) Int. Cl.[7] .................................................. H04Q 7/24
(52) U.S. Cl. ..................... 370/338; 370/395.1; 370/467; 455/560
(58) Field of Search .................. 370/338, 328, 370/329, 395.1, 395.2, 395.5, 395.52, 401, 466, 467, 469, 395, 396, 347, 398, 399, 400, 464, 465, 470, 471, 389, 392, 310, 310.1, 310.2; 455/560, 561

(56) References Cited

U.S. PATENT DOCUMENTS

| | | | | |
|---|---|---|---|---|
| 5,825,759 A | * | 10/1998 | Liu ............................ | 370/331 |
| 5,845,211 A | * | 12/1998 | Roach, Jr. ................... | 455/436 |
| 5,903,559 A | * | 5/1999 | Achrya et al. .............. | 370/355 |
| 5,946,634 A | * | 8/1999 | Korpela ...................... | 455/552 |
| 5,963,555 A | * | 10/1999 | Takase et al. ............... | 370/395 |
| 6,018,521 A | * | 1/2000 | Timbs et al. ................ | 370/342 |
| 6,151,314 A | * | 11/2000 | Rauhala ...................... | 370/350 |

FOREIGN PATENT DOCUMENTS

| | | |
|---|---|---|
| DE | 19535329 | 3/1997 |
| EP | 0660625 | 6/1995 |
| EP | 0729282 | 8/1996 |
| EP | 0731620 | 9/1996 |
| EP | 0749259 | 12/1996 |
| EP | 0796022 | 9/1997 |
| EP | 0 801 513 A1 * | 10/1997 |
| EP | 0801513 | 10/1997 |
| GB | 2265278 | 9/1993 |
| WO | WO 97/49254 | 12/1997 |

OTHER PUBLICATIONS

International Search Report for PCT/EP97/07351.
RFC 1987, "GSMP Protocol Specification" Aug. 1996.

* cited by examiner

*Primary Examiner*—Brian Nguyen
(74) *Attorney, Agent, or Firm*—Squire, Sanders & Dempsey L.L.P.

(57) ABSTRACT

A broadband cellular network device comprises a base station controller unit (1), an asynchrouous transfer mode controller (2) adapted to control the distribution of cellular traffic consisting of asynchrouous transfer mode cells in trunking mobile communication networks based on ATM technology, and an asynchrouous transfer mode switching means (3) controlled by said asynchrouous transfer mode controller (2). The base station controller unit (1), the asynchrouous transfer mode controller (2) and the asynchrouous transfer mode switching means (3) form an ATM based base station controller (BSC) capable of performing ATM switching and adapted to replace PCM based base station controllers in base station subsystems (BSS) of asynchrouous transfer mode based cellular networks.

6 Claims, 2 Drawing Sheets

BROADBAND CELLULAR NETWORK DEVICE

This application is a continuation of international application serial No. PCT/EP97/07351, filed 30 Dec. 1997.

FIELD OF THE INVENTION

The present invention relates to a device for controlling cellular traffic in a mobile communication system based on asynchronous transfer mode technology, and also concerns a base station controller using this device.

BACKGROUND OF THE INVENTION

In recent years, the Global System for Mobile Communications (GSM) and other cellular networks have grown rapidly all over the world. An accordingly increasing number of subscribers has led to a corresponding increase of bandwidth in trunking networks of cellular systems such as base station subsystems (BSS) in the GSM.

FIGS. 5a and 5b schematically show examples of parts of trunking networks in mobile communication systems. In such trunking networks, a mobile services switching center MSC and an associated visitor location register VLR are linked to a base station controller BSC. The base station controller BSC is in turn linked to a base transceiver station BTS, which is coupled with mobile stations (not shown) at respective end users. The base station controller BSC and the base transceiver station BTS constitute a so called base station subsystem BSS, which is indicated by dashed lines in FIGS. 5a and 5b.

In more detail, in FIG. 5a part of a conventional pulse code modulation (PCM) based trunking network is illustrated, in which the coupling links, i.e. the connections between network elements, and the switching in the base station controller BSC are all PCM based.

However, the integration of mobile stations such as mobile phones and data communication has recently given rise to the introduction of new data services like e.g. the Short Message Service (SMS) or the access to the Internet using a mobile station. Along therewith, an increasing demand for replacing these conventional narrow banded PCM networks with broadband communication systems can now be observed.

As a future data transfer technology for use in broadband communication systems, asynchronous transfer mode, in short also referred to as ATM, has been proposed.

The basic idea of asynchronous transfer mode is to transfer data in small data packets having a fixed size. These data packets are called cells. A flow of such cells represents a virtual channel connection VCC between respective end users. The virtual nature of the connection arises from the fact that cells are transferred only when there are data to be sent. In contrast to known connection-oriented systems, therefore, resources are not used when no useful payload is present.

Asynchronous transfer mode is also suitable for transferring packet data in e.g. GSM networks. In this respect, General Packet Radio Services (GPRS) have been proposed, in which data packets like e.g. IP traffic are transferred through GSM radio interface.

However, with a conventional PCM based base station subsystem as shown in FIG. 5a, such data packets must first be transformed into PCM format in the base transceiver station BTS and then retransformed into packet format before being sent to public packet data networks like e.g. the Internet. The same transformations must also be made for data packets traveling in the opposite direction, i.e. from the public data networks to the base transceiver station BTS. By use of asynchronous transfer mode procedures, this data transformation can be avoided, and it is moreover possible to directly route data packets in asynchronous transfer mode cells from the base station subsystem BSS to public asynchronous transfer mode based networks.

In order to use asynchronous transfer mode in the trunking network of a GSM system, at least the conventional PCM links between respective network elements must be replaced with ATM links. In the resulting arrangement, ordinary PCM based GSM network elements are then connected by ATM links, for which an example is shown in FIG. 5b.

Such a technique is called Circuit Emulation Services (CES), which, however, is not yet an effective realization of ATM, since the base station controller BSC and, thus, the base station subsystem BSS do in this case not support ATM switching.

Therefore, it is an object of the present invention to provide a device which is capable of supporting ATM switching at base station subsystem level and, thus, implements an effective realization of asynchronous transfer mode in mobile communication networks.

In view of the future expansions expected in such mobile communication networks, the present invention shall also provide a device which can be manufactured, installed and maintained at low cost. Asynchronous transfer mode technology may also provide a big increase in capacity when compared with PCM technology. Thus, the number of physical lines in base station subsystems can be reduced.

According to the present invention, this object is accomplished by a broadband cellular network device, comprising a base station control unit adapted to control the distribution of asynchronous transfer mode cellular traffic consisting of asynchronous transfer mode cells, an asynchronous transfer mode controller connected to and being controlled by said base station control unit, and an asynchronous transfer mode switching means connected to and being controlled by said asynchronous transfer mode controller and adapted to switch asynchronous transfer mode cellular traffic.

With the above configuration, an asynchronous transfer mode based broadband cellular network device is implemented by combining the functions of a base station controller unit with an asynchronous transfer mode switch.

The device is capable of performing asynchronous transfer mode switching in a base station subsystem and moreover represents an inexpensive basis for an asynchronous transfer mode based base station controller for use in asynchronous transfer mode based cellular networks.

Further embodiments of the present invention are subject of the attached dependent claims.

Preferably, said base station unit provides either of a software, hardware or mixed software/hardware implementation of base station controller functions and comprises an asynchronous transfer mode controller instruction means.

The asynchronous transfer mode controller is arranged to provide an interface for converting commands issued by the base station controller unit into commands causing switching actions of the asynchronous transfer mode switching means.

Advantageously, the asynchronous transfer mode controller is adapted to employ asynchronous transfer mode based signalling and to provide control commands for controlling connecting hardware of the asynchronous transfer mode switching means.

According to a further development, the asynchronous transfer mode controller is arranged to comprise at least two functional layers, one of the functional layers being a cellular network related upper layer adapted to perform cellular network related functions, and one of the functional layers being an asynchronous transfer mode related lower layer adapted to perform asynchronous transfer mode switching means related functions.

Thereby, the lower functional layer of the asynchronous transfer mode controller is advantageously arranged to control the switching hardware of the asynchronous transfer mode switching means.

In addition, the asynchronous transfer mode controller may be adapted to be a General Switch Management Protocol controller. Then, the asynchronous transfer mode switching means is adapted to support said General Switch Management Protocol.

BRIEF DESCRIPTION OF THE DRAWINGS

In the following, the invention will be described in greater detail by way of preferred embodiments with reference to the accompanying drawings, in which.

BEST MODES FOR CARRYING OUT THE INVENTION

Figure 1:
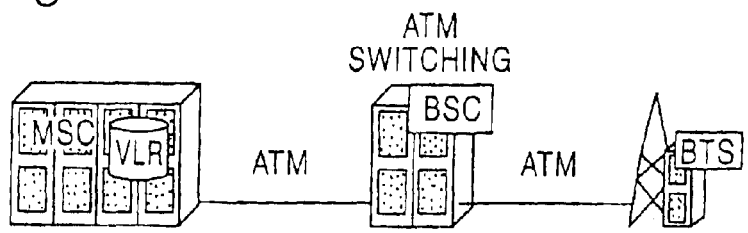
FIG. 1 schematically illustrates a mobile communications network using asynchronous transfer mode links and asynchronous transfer mode switching.
Figure 5:
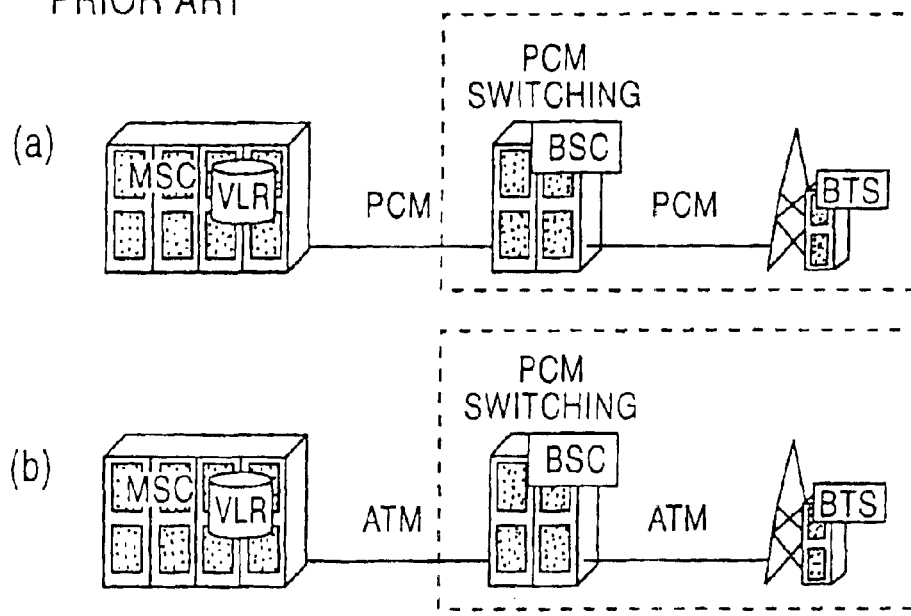
FIG. 5a schematically shows part of a known mobile communications network using PCM links and PCM switching.
FIG. 5b schematically shows part of a proposed mobile communications network using ATM links and PCM switching.

FIG. 1 schematically illustrates part of a mobile communications network, e.g. a GSM network, substantially comprising the same basic components as those of FIGS. 5a and 5b, but this time providing ATM links and ATM switching in the base station controller BSC itself.

That is, both the conventional PCM links between the mobile services switching center MSC and associated visitor location register VLR and the base station controller BSC and between the base station controller BSC and the base transceiver station BTS are replaced by ATM links. In addition, the base station controller BSC as the central switching element in the base station subsystem BSS is adapted to perform ATM switching.

Figure 2:
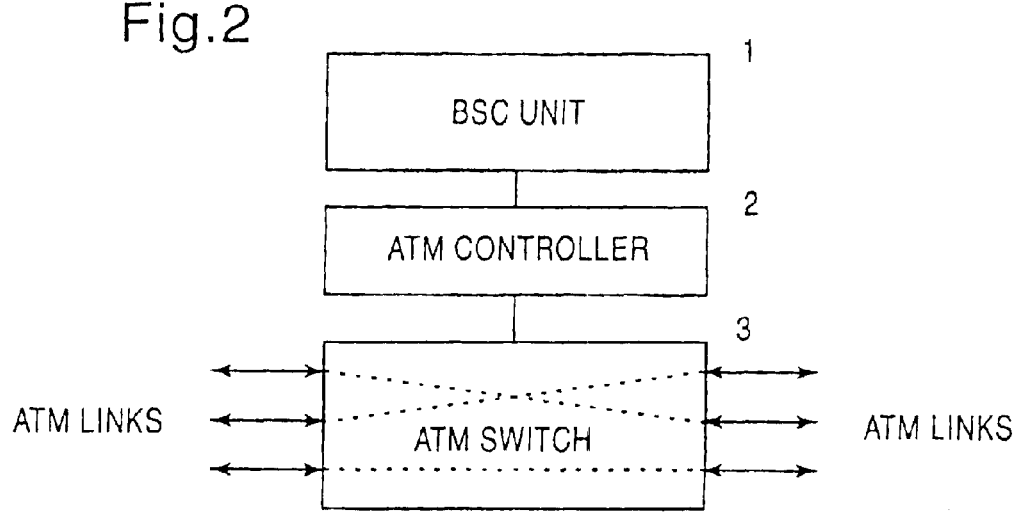
FIG. 2 illustrates the broadband cellular network device according to a first preferred embodiment.

FIG. 2 illustrates a base station controller BSC as a broadband cellular network device according to a first preferred embodiment. The device comprises a base station controller unit or BSC unit 1, respectively, an asynchronous transfer mode or ATM controller 2 and an asynchronous transfer mode or ATM switch 3.

The BSC unit 1 is connected to the ATM controller 2 and may consist of a pure software, a pure hardware or a mixed software/hardware implementation of an ordinary base station controller BSC. The BSC unit 1 provides for normal base station controller functions such as handover processing, GSM signalling etc., and also decides on the individual interconnections of traffic channels or signalling channels, if necessary.

The main difference between this BSC unit 1 and a conventional PCM based base station controller consists in that there are no PCM group switch and corresponding controller functions in the BSC unit 1. Instead, the BSC unit 1 comprises means (not shown) for instructing the ATM controller 2. In this respect, the BSC unit 1 can be arranged as a pure software implementation which emulates hardware base station controller functions, or can be arranged as a mixed implementation which uses part of the hardware of an ordinary base station controller.

The ATM controller 2 is connected to the ATM switch 3 and thereby provides an interface for the BSC unit 1 to issue commands for connecting or disconnecting traffic channels passing through the ATM switch 3. In addition, the ATM controller 2 also provides suitable commands for the ATM switch 3 in order to enable the hardware thereof to establish the required connections, and may include specific original equipment manufacturers' (OEM) adaptations required to have the ATM switch 3 work properly.

The ATM switch 3 forms the actual ATM hardware switching element. It is controlled by the ATM controller 2 either using a standardized interface like e.g. the General Switch Management Protocol (GSMP), or a corresponding proprietary solution.

ATM links coupling the ATM switch 3 to respective network elements arrive at and leave the ATM switch 3 at respective input and output ports thereof. Hence, the main function of the ATM switch 3 is to connect a virtual channel (VC) coming in at an input port to one or a plurality of virtual channels leaving at one or a plurality of output ports thereof. The port switching performed by the ATM switch 3 is, thus, capable of multicast operation, and is schematically indicated by dotted lines.

Figure 3:
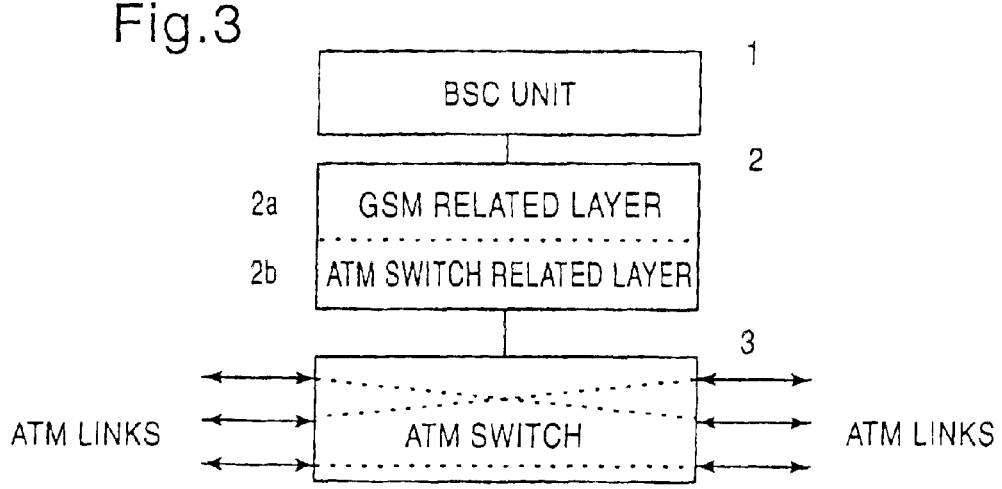
FIG. 3 illustrates the broadband cellular network device according to a second preferred embodiment.

FIG. 3 illustrates the broadband cellular network device according to a second embodiment.

While the BSC unit 1 and the ATM switch 3 fundamentally correspond to those used in the above described first embodiment, the ATM controller 2 is now separated into two functional layers. It is understood, however, that the number of layers is not limited to two, but may be any number suitable for realizing the functions to be performed by the ATM controller 2.

In the shown two layer structure, the ATM controller 2 includes an upper layer 2a and a lower layer 2b. In accordance with the GSM system serving as the example mobile communications network, the upper layer 2a constitutes a GSM related layer caring for the conversion of signalling and other GSM related items, as shown in FIG. 3, and instructs the lower layer 2b which ports and/or virtual channels are to be interconnected or switched, respectively, in the ATM switch 3. Accordingly, the lower layer 2b will care for other, e.g. ATM switch related tasks such as maintenance and error handling of the ATM switch 3.

Figure 4:
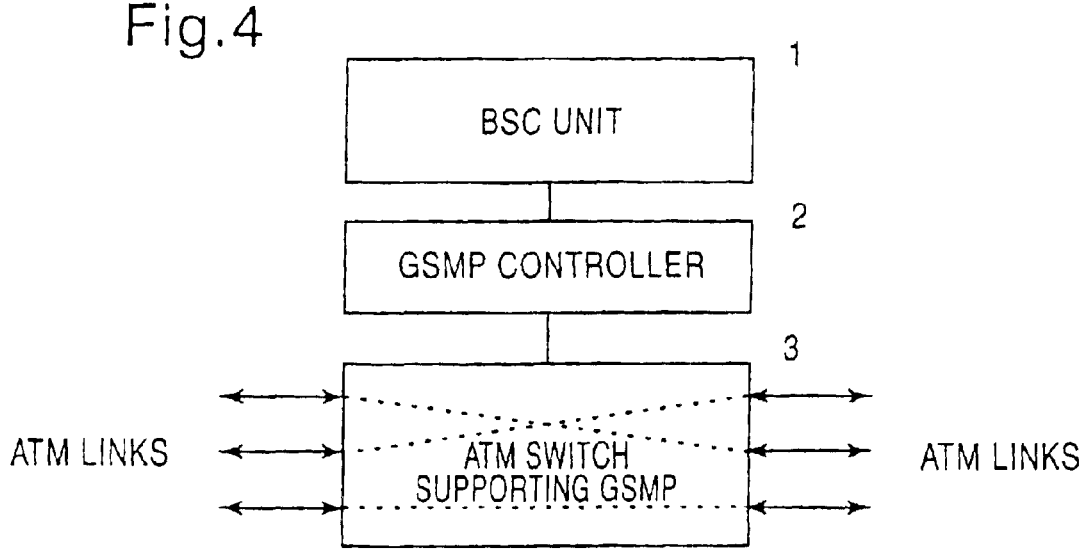
FIG. 4 illustrates the broadband cellular network device according to a third preferred embodiment.

FIG. 4 illustrates the base station controller as the broadband cellular network device according to a third embodiment.

While the BSC unit again corresponds to that of the first embodiment, a General Switch Management Protocol (GSMP) controller 2 is employed here instead of the ATM controllers 2 according to the first and second embodiments, and the ATM switch 3 is adapted to support the GSMP used by the GSMP controller 2.

The GSMP, which has recently been published under the reference RFC1987 by the Internet Engineering Task Force, is a general purpose protocol which provides an interface for controlling a hardware based ATM switch 3. The GSMP allows a controller to establish and release connections across the ATM switch 3, to add and delete leaves on a point-to-multipoint connection, to manage the individual ports of the ATM switch 3, and to request configuration information and statistics.

According to the third embodiment, an ATM based base station controller BSC is provided comprising a combination of a base station controller unit and a GSMP switch using a GSMP controller in-between. This arrangement provides for a fast and at the same time cheap construction of an ATM based base station controller BSC. In this construction, it is possible to combine the BSC unit 1 with any kind of GSMP switch. In this manner, hardware of a variety of different manufacturers can be used, and the capacity of the underlying network can easily be scaled up when additional base transceiver stations BTS and transceivers (TRX) (not shown) are introduced into the base station subsystem BSS.

It should be understood that the above description and accompanying figures are only intended to illustrate the present invention. Thus, the device according to the invention may also be used in networks other than the GSM referred to as an example. The preferred embodiments of the invention may also vary within the scope of the attached claims.

What is claimed is:

1. A broadband cellular network device connected to a mobile services switching center and to one or more base transceiver stations with asynchronous transfer mode links, comprising:

a base station control unit adapted to control distribution of asynchronous transfer mode cellular traffic consisting of asynchronous transfer mode cells, an asynchronous transfer mode controller, separate from said base station control unit, connected to and being controlled by said base station control unit, and an asynchronous transfer mode switching means connected to and being controlled by said asynchronous transfer mode controller an adapted to switch asynchronous transfer mode cellular traffic, wherein said asynchronous transfer mode controller being arranged to function between the base station control unit and the asynchronous transfer mode switching means and being arranged to provide an interface for converting commands of a first communication protocol issued by the base station control unit into commands of a second communication protocol causing switching actions and being configured to provide an interface for issuing commands for connecting and disconnecting traffic channels passing through the asynchronous transfer mode switching means.

2. A device according to claim 1, wherein said base station control unit provides either of a software, hardware or mixed software/hardware implementation of base station controller functions and comprises an asynchronous transfer mode controller instruction means adapted to instruct the asynchronous transfer mode controller.

3. A device according to claim 1, wherein the asynchronous transfer mode controller is adapted to employ asynchronous transfer mode based signalling and to provide control commands for controlling connecting hardware of the asynchronous transfer mode switching means.

4. Device according to claim 1, wherein the asynchronous transfer mode controller is arranged to comprise at least two functional layers, one of the functional layers being a cellular network related upper layer adapted to perform cellular network related functions, and one of the functional layers being an asynchronous transfer mode related lower layer adapted to perform asynchronous transfer mode switching means related functions.

5. Device according to claim 4, wherein the lower functional layers of the asynchronous transfer mode controller is arranged to control the switching hardware of the asynchronous transfer mode switching means.

6. Device according to claim 1, wherein the asynchronous transfer mode controller is adapted to be a General Switch Management Protocol (GSMP) controller, and wherein the asynchronous transfer mode switching means is adapted to support said General Switch Management Protocol.

* * * * *